United States Patent [19]

Nono et al.

[11] Patent Number: 4,598,674
[45] Date of Patent: Jul. 8, 1986

[54] ROCKER ARM SPRING FOR A VALVE ACTUATING MECHANISM OF AN INTERNAL COMBUSTION ENGINE

[75] Inventors: Yasushi Nono; Yoshio Sasaki, both of Toyota, Japan

[73] Assignee: Toyota Jidosha Kabushiki Kaisha, Toyota, Japan

[21] Appl. No.: 690,191

[22] Filed: Jan. 10, 1985

[30] Foreign Application Priority Data

Jan. 13, 1984 [JP] Japan .................. 59-3550

[51] Int. Cl.[4] .............................. F01L 1/46
[52] U.S. Cl. .................. 123/90.41; 123/90.44
[58] Field of Search .............. 123/90.41, 90.43, 90.44

[56] References Cited

U.S. PATENT DOCUMENTS

| 3,542,001 | 11/1970 | Line | 123/90.43 |
| 3,563,215 | 2/1971 | Ross | 123/90.42 |
| 3,602,205 | 8/1971 | Turkish | 123/90.43 X |
| 3,805,753 | 4/1974 | Bergman et al. | 123/90.43 X |

FOREIGN PATENT DOCUMENTS

| 875350 | 8/1961 | United Kingdom | 123/90.43 |
| 963995 | 7/1964 | United Kingdom | 123/90.43 |
| 1437567 | 5/1976 | United Kingdom | 123/90.43 |

Primary Examiner—William R. Cline
Assistant Examiner—Peggy A. Neils
Attorney, Agent, or Firm—Kenyon & Kenyon

[57] ABSTRACT

A rocker arm spring particularly suitable for use in a valve actuating mechanism of the type wherein a rocker arm is mounted to the cylinder head by way of a universal pivot and wherein an overhead cam shaft engages an intermediate portion of the rocker arm. The universal pivot (28) includes a support socket (30) and a pivotable shaft (40), with the part-spherical convex lower end of the shaft (40) received in the part-spherical concave bearing surface (38) of the socket (30). The rocker arm spring (50) has an upper arm (56) engaging the rocker arm (24) and a lower arm (58) having a forked end (68) engaging a circumferential groove (74) on the socket (30). The lower arm (58) is warped perpendicular to the plane thereof so that it is resiliently fitted without play within the groove (74).

2 Claims, 6 Drawing Figures

ROCKER ARM SPRING FOR A VALVE ACTUATING MECHANISM OF AN INTERNAL COMBUSTION ENGINE

BACKGROUND OF THE INVENTION (1) Field of the Invention

The present invention relates to a rocker arm spring for use in a valve actuating mechanism of an internal combustion engine and, more particularly, to a rocker arm spring for a valve actuating mechanism of the type which comprises an overhead cam shaft and wherein a rocker arm is swingably supported on the cylinder head of the engine through a universal pivot.

(2) Description of the Related Art

A valve actuating mechanism for an internal combustion engine is known which comprises a rocker arm swingably supported at one end on the cylinder head by means of a universal pivot and wherein an overhead cam shaft engages the mid portion of the rocker arm to operate an intake or exhaust valve of the engine (see, for example, British Patent Specification No. 875,350, published Aug. 16, 1961; U.S. Pat. No. 3,563,215, granted to Ross on Feb. 16, 1971; and British Patent Specification No. 1,437,567, published May 26, 1976). The universal pivot comprises a part-spherical socket formed in the one end of the rocker arm, the socket receiving a part-spherical head of a fulcrum stud. A spring clip assembly in the form of a hairpin spring is used to hold the socket in contact with the stud head.

British Patent Specification No. 963,995, published July 15, 1964, discloses another type of valve gear arrangement in which an end of the rocker arm is also supported by a universal pivot. The universal pivot comprises a support socket mounted on the cylinder head and having a part-spherical concave bearing surface, and a pivotable shaft adjustably mounted to the rocker arm and having a part-spherical convex lower end engaging with and resting on the bearing surface of the support socket. As shown in FIG. 3 thereof, the valve gear arrangement includes a rocker arm spring in the form of a leaf spring having a loop configuration, the upper arm of which has an end clamped to the rocker arm. The lower arm of the leaf spring is clamped to the support socket. The leaf spring serves to take up any play in the universal pivot and to hold the rocker arm in contact with the valve stem.

In a copending U.S. patent application Ser. No. 460,021, filed Jan. 21, 1984 and assigned to the assignee of the present invention, there is disclosed a valve actuating mechanism also having a rocker arm spring of the leaf spring type. This rocker arm spring is roughly U-shaped and has an upper arm section engaging the rocker arm. The lower arm section has a forked end which is fitted within a circumferential groove formed in a support socket secured to the cylinder head. In this arrangement, the thickness of the rocker arm spring is smaller than the width of the circumferential groove so that the forked end of the lower arm section is loosely fitted in the groove and that the forked end is urged for support against the upper side wall of the groove by the spring force. The play present between the side walls of the groove and the forked end of the lower arm permits the forked end to rattle within the groove as the rocker arm spring vibrates in response to the swinging movement of the rocker arm. This causes premature failure and undue wear of the rocker arm spring.

SUMMARY OF THE INVENTION

The object of the present invention is to provide a rocker arm spring specifically adapted for use in the valve actuating mechanism of the type described and which has a longer service life and is not subject to premature failure and wear.

This invention provides a rocker arm spring having a lower arm section with a forked end engageable within a circumferential groove in the support socket forming the universal pivot. According to the invention, the lower arm section of the spring is warped perpendicular to the plane of the lower arm. With this configuration, the lower arm section snugly and resiliently fits against both side walls of the circumferential groove of the support socket without play, thereby preventing any rattling movement.

DESCRIPTION OF THE PREFERRED EMBODIMENT

Figure 1:
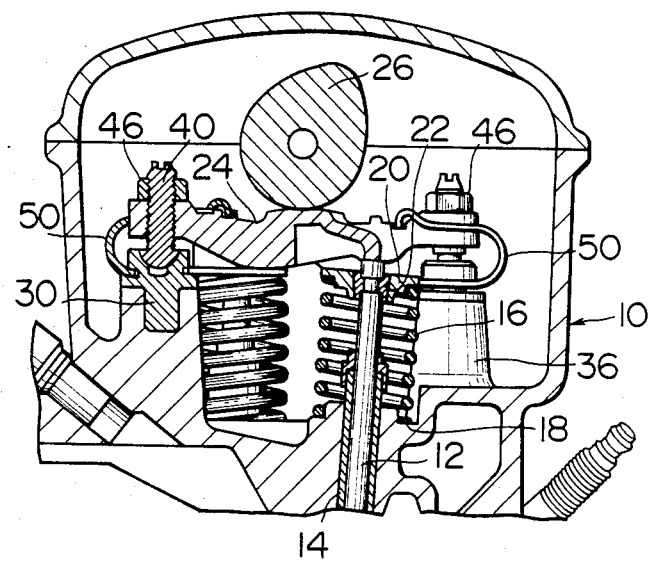
FIG. 1 is a transverse cross-sectional view of a part of the cylinder head of an engine having a valve actuating mechanism provided with a rocker arm spring according to the present invention.

Referring to FIG. 1, there is shown a part of a cylinder head 10 of a multicylinder internal combustion engine. The cylinder head 10 is provided with a plurality of intake or exhaust valves, one of which is shown at 12. As usual, the valve stem of each valve 12 is slidably received in and guided by a valve guide 14 mounted in the cylinder head 10. A valve spring 16 is provided between a spring seat 18 formed on the upper face of the head 10 and a spring retainer 20 fixed by a split cotter 22 to the upper end of the valve stem. Each valve 12 is biased toward its closed position by the valve spring 16 and is lifted by an associated rocker arm 24 driven by a cam 26 on an overhead cam shaft suitably journaled on the cylinder head 10.

Figure 2:
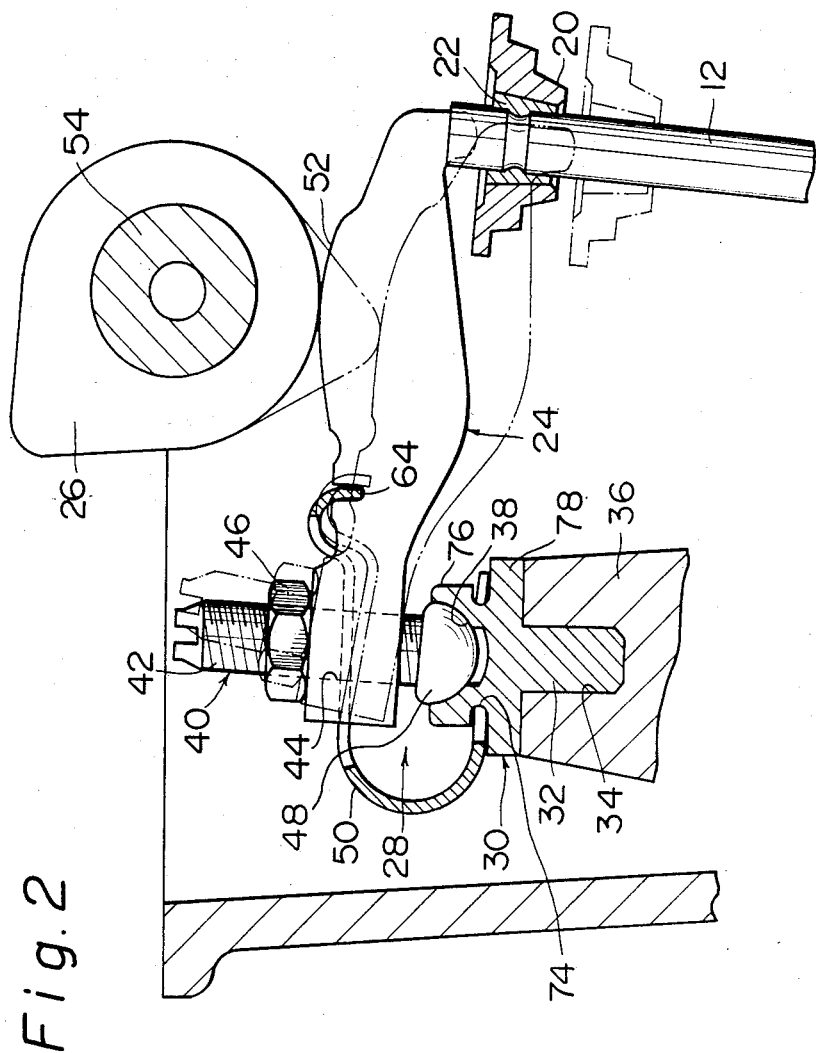
FIG. 2 is an enlarged schematic elevational view, partly cut away, of the valve actuating mechanism shown in FIG. 1 and showing the detailed structure and the mode of operation thereof.

As best shown in FIG. 2, the rocker arm 24 is swingably supported at its lefthand end, as viewed in FIG. 2, by a universal pivot assembly, generally designated 28. The universal pivot 28 includes a support socket 30 having a shank portion 32 press-fitted within a bore 34 in a boss 36 of the head 10. The support socket 30 is provided at its head with a part-spherical concave bearing surface 38. A pivotable shaft 40, forming the other part of the universal pivot 28, has a threaded shank portion 42 screwed into an internally threaded bore 44 formed in the lefthand end of the rocker arm 24 and is fixed in position by a lock nut 46. The pivotable shaft 40 has a part-spherical convex lower end portion 48 mating with and received in the concave bearing surface 38 of the socket 30.

A rocker arm spring 50, to be described later in more detail with reference to FIGS. 4 through 6, serves to hold the pivotable shaft 40 and the socket 30 together, and to urge the righthand end of the rocker arm 24 into contact with the top of the valve stem. The rocker arm 24 is provided with a pad portion 52 in sliding contact with the cam 26 of the overhead cam shaft 54. As the cam shaft 54 rotates, the nose portion of the cam 26 is brought into contact with the pad portion 52 causing the rocker arm 24 to swing about the center of the universal pivot 28, as shown by the phantom line in FIG. 2, thereby lifting the intake or exhaust valve 12. The tappet clearance of the valve actuating mechanism may be adjusted by releasing the lock nut 46 and turning the pivotable shaft 40 in either direction.

Figure 3:
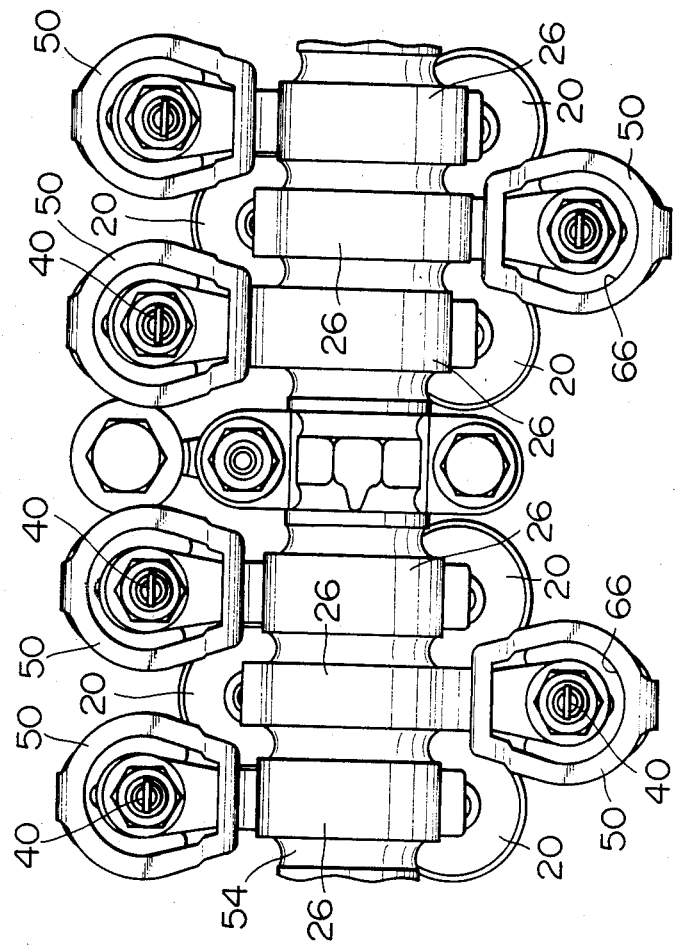
FIG. 3 is a top plan view of the valve actuating mechanism shown in FIG. 1.

As can be understood from FIG. 3, in the illustrated example, each cylinder has two intake valves and one exhaust valve. To this end, the cam shaft 54 is provided for each cylinder with three cams 26 respectively engaging with associated rocker arms. However, the number of valves may be altered depending on the engine design.

Figure 4:
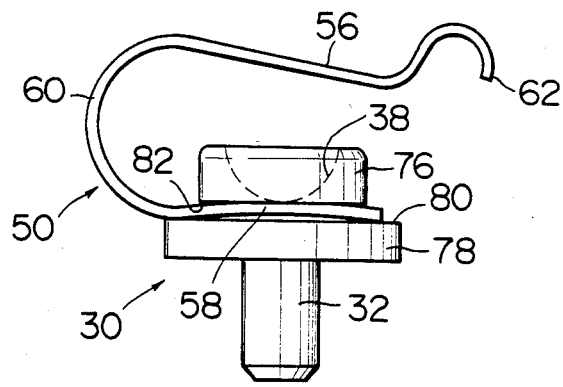
FIG. 4 is an elevational view of the rocker arm spring according to the invention as assembled to a support socket.
Figure 5:
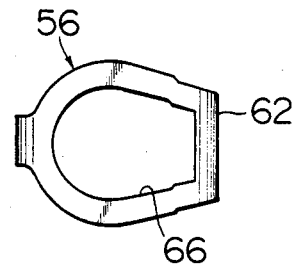
FIG. 5 is a top plan view, on a reduced scale, of the upper arm section of the rocker arm spring.

Referring to FIG. 4, the rocker arm spring 50 is composed of a roughly U-shaped leaf spring having upper and lower arm sections 56 and 58 interconnected by an intermediate section 60. The spring 50 may be made by punching a sheet of spring steel into blanks and by stamping and bending the blanks followed by hardening. As shown in FIG. 4, in the free state of the rocker arm spring 50, the open ends of the upper and lower arm sections 56 and 58 slightly converge toward each other. The upper arm 56 is longer than the lower arm 58, and the region of the upper arm adjacent to the free end thereof is shaped in a semicircular cross-section as shown so that the free end 62 is directed downward. As best shown in FIG. 2, the free end 62 of the upper arm 56 engages in a transverse groove 64 formed on the rocker arm 24. The upper arm section 56 of the spring 50 has an outer configuration as shown in FIG. 5 and is provided with an aperture 66. As best seen from FIGS. 2 and 3, the pivotable shaft 40 and the lefthand end of the rocker arm 24 extend through the aperture 66 so that the spring 50 partly encircles the universal pivot assembly 28.

Figure 6:
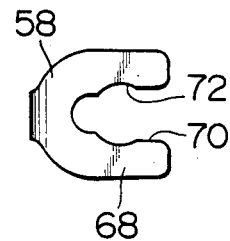
FIG. 6 is a bottom view, on a reduced scale, of the lower arm section of the rocker arm spring.

As shown in FIG. 6, the lower arm section 58 of the spring 50 has a forked end 68 defined by a cut out 70 having circular portions 72. As shown in FIGS. 2 and 4, the forked end 68 of the spring 50 is snap-fitted within a circumferential groove 74 formed on the head of the support socket 30. The groove 74 splits the head of the socket 30 into an upper flange 76 and a lower flange 78, with the upper flange 76 having a smaller diameter than that of the lower flange 78. Thus, the lower side wall 80 of the groove 74 has a larger bearing surface than that of the upper side wall 82.

The lower arm section 58 of the rocker arm spring 50 in its free state is warped perpendicular to the plane of the lower arm section 58. Thus, when fitted within the groove 74, the upper and lower surfaces of the lower arm section 58 resiliently and snugly abut against the upper and lower side walls 82 and 80 of the groove 74 as shown in FIG. 4, to securely support the lower arm section 58. Therefore, the lower arm section 58 is held without play within the circumferential groove 74 during the flexural movement of the rocker arm spring 50 caused by the swinging of the rocker arm 24, thereby preventing any excessive wear and premature failure of the spring 50.

What is claimed:

1. A rocker arm spring for use in a valve actuating mechanism of an internal combustion engine having a cylinder head, an overhead camshaft mounted on the cylinder head and a valve having a valve stem extending through the cylinder head, the valve actuating mechanism including a rocker arm having a first end and a second end, a universal pivot swingably supporting the first end of the rocker arm on the cylinder head of the engine, the second end of said rocker arm being in contact with the valve stem, and a cam on the overhead camshaft engaging from above a portion of said rocker arm intermediate said first and second ends to cause said rocker arm to swing about said universal pivot, the universal pivot including a support socket mounted on said cylinder head, the support socket having a part-spherical concave bearing surface and a circumferential groove with a fixed predetermined groove width, and a pivotable shaft mounted on the first end of the rocker arm, the pivotable shaft having a part-spherical convex lower end mating with and received in said concave bearing surface, and said rocker arm spring being in the form of a leaf spring made of an elongated strip of resilient material thinner than the predetermined groove width, the strip being bent to a substantially U-shape having an upper arm and a lower arm, said lower arm having a forked end engageable within the circumferential groove in said support socket, said upper arm being engageable with said rocker arm for urging said lower end of the pivotable shaft into contact with said bearing surface of the support socket as well as for biasing the second end of the rocker arm into contact with said valve stem, wherein the improvement comprises:

said lower arm of the rocker arm spring being warped from a flat plane so as to contact snugly and resiliently one side of said circumferential groove of the support socket at two spaced apart locations and the opposite side of said groove at a single location intermediate said two spaced apart locations when said forked end is engaged within said circumferential groove.

2. A rocker arm spring according to claim 1 wherein the lower arm of the spring is warped by bending the forked end of the lower arm to a curvature sufficient to cause the lower surface of the forked end to firmly and resiliently contact the lower side of the circumferential groove of the support socket at said two spaced apart locations and the upper surface of the forked end to firmly and resiliently contact the upper side of the groove at said intermediate location.

* * * * *